May 28, 1968   J. C. BLISS ET AL   3,385,159
RANGING INSTRUMENT
Filed June 1, 1964
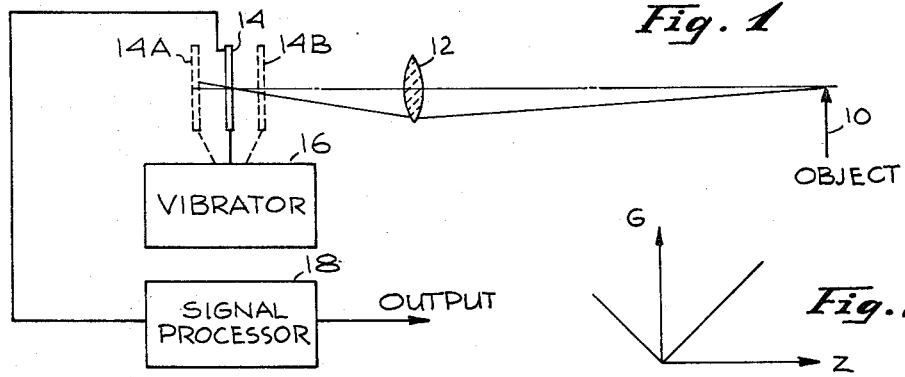
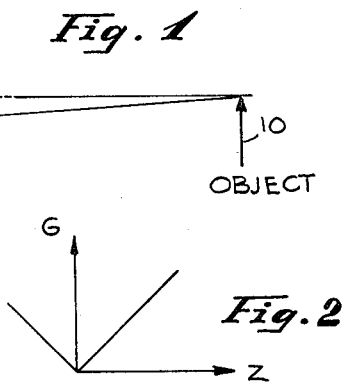
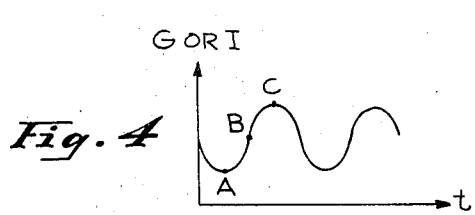
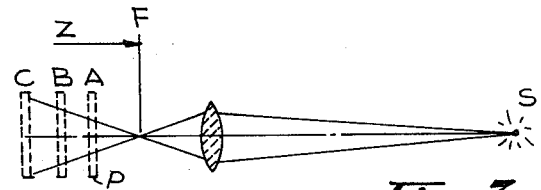
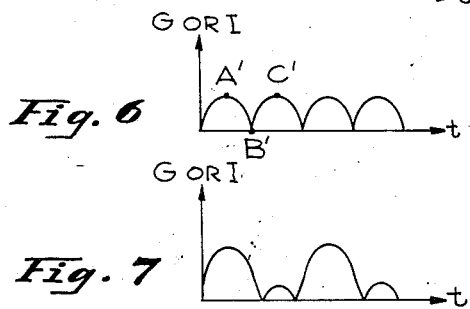
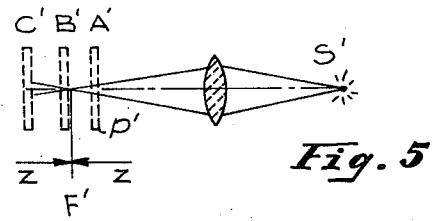
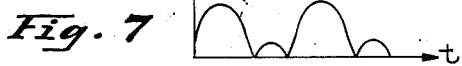
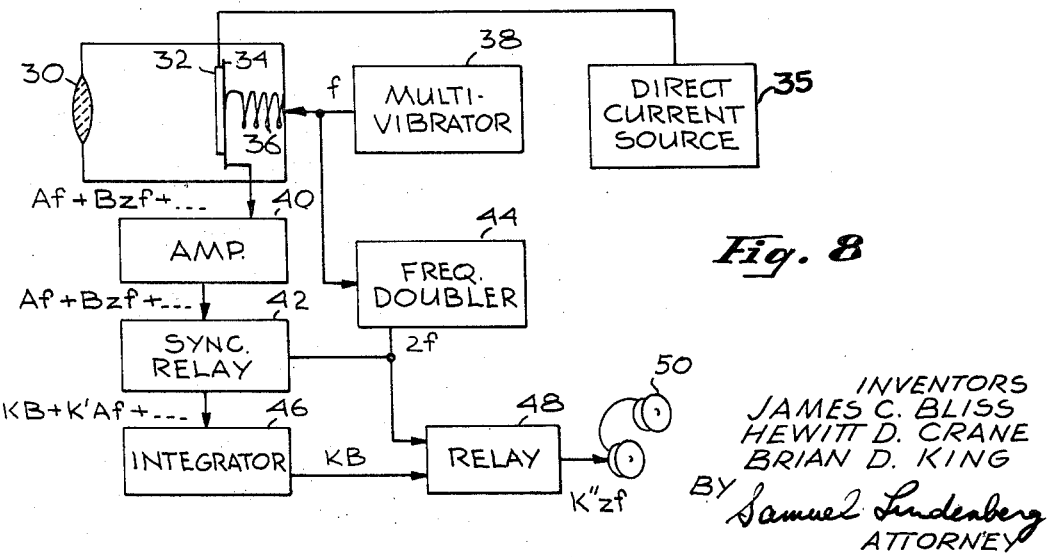
INVENTORS
JAMES C. BLISS
HEWITT D. CRANE
BRIAN D. KING
BY Samuel Lindenberg
ATTORNEY 3,385,159
RANGING INSTRUMENT
James C. Bliss, Los Altos, and Hewitt D. Crane and Brian D. King, Palo Alto, Calif., assignors, by mesne assignments, to the United States of America as represented by the Secretary of Health, Education, and Welfare
Filed June 1, 1964, Ser. No. 371,369
6 Claims. (Cl. 88—1)

ABSTRACT OF THE DISCLOSURE

A lens is positioned to focus the light received from an object at a photocell which is vibrated at a fundamental frequency toward and away from said lens. The vibrational direction is along the optical path of said lens and traverses the focus plane of the lens. The photocell is made to have a nonlinear light to electrical signal output response characteristic. As a result, its electrical output is a signal having second harmonics and multiples thereof of the frequency of vibration of the photocell. The output signal may thereafter be processed to provide an indication, such as an audio signal among the presence of which indicates the presence of an object within the zone of interest and the amplitude of said signal indicates the position of said object within said zone of interest.

---

This invention relates to automatic optical rangefinding and focussing devices and more particularly to improvements therein.

There are many situations where it is desirable to accomplish rangefinding automatically and without the aid of human eyesight. For example, blind people have a need for detecting nearby objects, especially moving objects or objects raised above the ground which are not easily detectable with a cane. A camera with an automatic focussing arrangement which does not require sightings and adjustments by the photographer, would be a desirable apparatus. So would an automatic rangefinding device which can stop or warn two vehicles which have approached too close to one another. It thus appears that a rangefinding device which operates automatically, without requiring the eyesight of a human operator would be of great value.

Several automatic rangefinding devices have already been developed, including systems which employ sound waves or radar waves to detect objects or to determine their distances. However, these systems have generally required the use of transducers for generating sound or radar waves and complicated detection systems for determining the time required for reflected waves to return. No systems developed heretofore have provided a relatively simple, light weight and accurate rangefinding system for detecting all types of nearby objects which are both on and off the axis of the system or the distances to them which, for example, could be easily carried by a blind person to assist him in avoiding objects and obstacles.

Accordingly, an object of this invention is to provide a relatively simple rangefinding device which enables the rangefinding of objects automatically, without the aid of human eyesight.

Another object of this invention is to provide an automatic passive rangefinding system which can detect whether there is an object within a specified range of distances, whether on or off the axis of the instrument and regardless of the shape of the object.

Yet another object is to provide a simple and efficient aid for the blind which enables them to detect the presence of nearby objects without making physical contact therewith.

These and other objects of this invention may be achieved in an arrangement which includes lenses for casting an optical image on a photosensitive cell. The cell provides an electrical output representative thereof. Means are provided for vibrating the cell toward and away from the lenses so that objects over the region at a predetermined distance in front of the lenses will be brought into and out of focus on the cell surface. Photoelectric cells generally have nonlinear characteristics so that a given amount of light incident on the cell yields a different electrical output when it is concentrated in a small area as compared to when it is diffused. Accordingly, when an image cast on the photoelectric cell is in focus, the resulting sharp image yields a different electrical output than when the image is out of focus and its light is diffused. As the cell and the lenses are moved relative to one another, the image of an object located at a predetermined distance will be brought into and out of focus, and the image causes a current flow through the cell which reaches a maximum or minimum at the position of sharpest focus. All other objects in the field of view which are too close or too far away to be brought into focus will, as a result of motion of the cell in one direction, cause a current flow which continuously either falls or rises, but not a current flow which reaches a maximum or minimum. An electrical detecting circuit connected to the photoelectric cell can determine if a component of the current from the cell reaches a maximum or minimum value during a period when the cell has not reversed its direction of movement. The movement of the vibrating cell can be made small so that only objects within a predetermined small distance range will be brought into focus. As a result, when the detecting circuit indicates that a current component reaches a maximum or minimum while the cell moves in one direction, it has indicated that there is an object within the range of distances.

The electrical detecting circuit of the invention may be a simple device which merely detects alternating current from the photosensitive cell at two or if desired higher even harmonics of the frequency of vibration of the cell. The cell is usually vibrated at a constant frequency such as 30 cycles per second. Objects which are too far away to be brought into focus during the short movement of the cell generate a current which nominally varies at 30 cycles per second. Objects which are brought into focus and out again will generate an electrical current of 60 cycles per second. Thus, when a component of current output of twice the frequency of the cell vibration is detected, an object is within the range of detection of the device.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a diagrammatic representation of a ranging instrument constructed in accordance with the invention;

FIGURE 2 is a graph showing the idealized characteristics of a non-linear photoconductive cell illuminated by the image of a point source of light, and in particular showing the relationship between the conductance of the cell and the distance of the cell from the position of sharpest focus;

FIGURE 3 is a representation of an arrangement whereby a vibrating photocell is illuminated by the image of a point source of light, and wherein the image is never sharply focused on the photocell;

FIGURE 4 is a graph showing the variation with time of the conductance of the photocell of FIGURE 3 assuming the characteristics of FIGURE 2 when it is vibrated so that its position varies sinusoidally with time;

FIGURE 5 is a diagrammatic view of a situation similar to that of FIGURE 3 wherein the image of the point source of light is focused on the photocell at some position along its path of vibration;

FIGURE 6 is a graph showing the variation with time of the conductance of the cell of FIGURE 5 when it is vibrated sinusoidally with time;

FIGURE 7 is a graph showing the variation of the conductance or current output (assuming constant voltage) of a photosensitive cell having the non-linear characteristics of FIGURE 2, wherein the image of a point source of light is focused on the cell near one of its extreme positions of vibration; and FIGURE 8 is a diagrammatic view of a sensitive ranging system constructed in accordance with the invention.

Referring now to the drawings and particularly FIGURE 1, which shows a simplified diagrammatic view of a device constructed in accordance with the invention for detecting the presence of objects, as represented by an arrow 10, which lies within a predetermined distance range from the device. The device comprises a lens 12 for focussing images on a photosensitive cell 14 having non-linear response characteristics, and producing electrical signals in accordance with the light incident thereon. A vibrator 16 vibrates the cell 14 toward and away from the lens. The output of the photocell 14 is applied to a signal processor 18 which operates to detect certain characteristics in the electrical signals received from the cell which indicate the presence of objects in the predetermined distance range.

The lens 12 receives light rays from the object 10 and focuses them on the surface of the cell 14 to create an optical image thereon. The cell 14 is vibrated so that it is moved between two extreme positions, denoted by 14A and 14B, along the optical path between the lens and cell. The extreme positions 14A and 14B are chosen so that when an object 10 lies within the range of distances at which objects are to be detected by the device, its image is sharply focused on the cell 14 at some position of the cell. For example, if objects lying within six to eight feet in front of the lens are to be detected, the position 14A is chosen so that it receives a focused image when the object is six feet away and the position 14B is chosen so that it receives a focused image when the object is eight feet away. The vibrator 16 may be any of a number of well-known devices capable of transporting the cell back and forth, including the cone of a loudspeaker, a slidably mounted frame driven by a crank, a piezoelectric crystal, or an electromagnetically driven reed.

As the cell 14 travels back and forth, it generates an electrical signal. Objects which are always out of focus generate a signal which reaches a maximum or a minimum only at the extreme positions 14A and 14B. However, when an object lies within the detectable range, it causes the generation of a signal component which reaches a maximum or minimum as its image comes into and out of focus on the cell during the travel of the cell between its extreme positions 14A and 14B. The signal from the cell is received by the signal processor 18 which can detect a maximum or minimum of a signal component that occurs while the cell is traveling in one direction either toward or away from the lens. By detecting these maxima or minima, the signal processor detects an object within the predetermined range. The detection of a maximum or minimum here is, of course, the same as detecting a reverse in the direction of change of a signal component, from rising to falling or vice-versa.

The change in electrical output from the cell 14 as the image is made sharp or diffuse, is due to the non-linear characteristics of the photosensitive material of the cell 14 and the photocell geometry. By non-linear, it is meant that the electrical characteristics, such as conductivity in the case of a photoresistive cell, or voltage or current output in the case of a photovoltaic cell, are not proportional to the incident light flux. This requirement can be appreciated by considering the output from a cell with linear characteristics. For a linear cell, the electrical output depends only on the total light incident on the cell. Whether an image is sharply focused or not, as long as the same amount of light falls on the cell, the output of the cell will be constant as long as the field of view is constant.

In the case of a photosensitive cell with non-linear characteristics, the output depends not only on the total light, but also on the distribution of the light, in particular upon the sharpness of focus of an image thereon. Each elemental area of such a cell generates a signal which is not proportional to the amount of incident light. Thus, if a given amount of light is distributed over two areas of the cell, the total output from the two areas will not equal the output obtainable by concentrating all the light on one area. Causing an image to become out of focus is essentially distributing the light falling originally on one area, over the adjacent area. The conductance of the cell will be a maximum or a minimum when the incident image is sharply in focus depending on whether the electrical output of the cell increases proportionately more or less rapidly than the intensity of incident light. Photocells having a construction such that they operate non-linearly are known. For example, the cell may be divided into two or more sections which are not in the same viewing plane, or special electrode arrangements may be used.

Among the possible methods of detecting the presence of a focused image on the cell, one of the simplest and most efficient methods involves the detection of a frequency component which is an even harmonic of the frequency of vibration of the cell. If the cell is vribated at a certain fundamental frequency, the output current of the cell will generally have that same fundamental frequency when no object is within the detectable range. However, when an object comes within range, a signal component of twice the fundamental frequency of vibration of the cell is produced, plus other even harmonic frequencies of the fundamental. By providing a signal processor 18 of FIGURE 1 which yields a warning or other output only when a signal of twice the fundamental frequency or having a large magnitude of even harmonics is detected, a simple and efficient detector is obtained.

The detection mechanism whereby, for example, a frequency of twice the fundamental frequency of vibration of the cell is generated can be appreciated by considering a photoconductive cell illuminated by the image of a point source of light, in a manner as shown in FIGURE 3 or 5. The characteristics of the cell, as illustrated in FIGURE 2, are such that as the image comes into focus a circle of light from the image on the cell grows brighter (but smaller), and varying therewith the conductance of the cell decreases. Assume also that the relationship between the distance of the cell from the position of focus and the conductance of the cell is a linear one, as shown in the graph of FIGURE 2, wherein G represents the photocell conductance and z represents distance of the cell from the position of focus. If the cell of FIGURE 2 is illuminated by a point source of light S in the manner in FIGURE 3, but is only moved between the positions A and C, which never cross the position of focus F, then the conductance of the cell will vary linearly with distance z from the focus position F. If the cell P is vibrated between positions A and C at a rate which varies sinusoidally with time, the conductance will vary in a manner shown in FIGURE 4 where G represents conductance, $t$ represents time, and the points A, B, and C represent the conductances obtaining at the positions A, B, and C respectively in FIGURE 3. It can be seen from FIGURE 4 that the resulting conductance varies sinusoidally at the same frequency as the cell is vibrated if the cell never crosses the point of focus F.

FIGURE 5 shows a situation identical to that of FIGURE 3 except that the point source S' is now in a position wherein its image is focused at a position F' which is crossed by the cell P' at position B'. As the cell is vibrated between positions A' and C' in FIGURE 5, its conductance varies in the manner shown in FIGURE 6. The conductance decreases to zero as the position of focus B' is passed, and then increases. The curve of FIGURE 6 is composed primarily of even harmonics of the signal of FIGURE 4, and is composed especially of twice the frequency of vibration of the cell.

If a battery is connected across the photocell, a current, identical in form to the conductance curve is obtained. For a cell vibrated at frequency $f$, the current output for the cell of FIGURES 3 and 4 is composed largely of a signal of frequency $f$. For the cell of FIGURES 5 and 6 vibrated at the same frequency $f$, the current output is composed largely of a signal of frequency $2f$. The signal also contains higher, even harmonics of the signal $f$. If the center of focus is not at the center of vibration of the cell, but is near one extreme position, a conductance and current waveform of the type shown in FIGURE 7 is obtained. The waveform of FIGURE 7 contains a substantial amount of harmonic signals of frequency $2f$ and higher, though not as high a proportion as that of the waveform of FIGURE 6.

If the current derived from the photosensitive cell is monitored to determine when a signal is obtained containing a large harmonic content of the frequency of vibration of the cell, then the field of view is being monitored to detect objects within a certain range of distances. The strength of the harmonics increases as the object comes within range until it casts an image lying at the center of the path of vibration of the cell.

The detection of signals from the photosensitive cells, of twice the fundamental frequency of vibration of the cells, may be accomplished in many ways. One of the simplest ways is to pass the signals through a high pass filter. However, there are many applications where extreme sensitivity is required, as where the object to be detected is largely masked in a bright background. Very high sensitivity is obtainable by utilizing a synchronous detector, e.g., by a relay driven at exactly twice the fundamental frequency of vibration of the photocell. A circuit utilizing this detection technique is shown in FIGURE 8.

The circuit of FIGURE 8 comprises a lens 30, which focuses light on a photoconductive cell 32 spaced from the lens and mounted on the cone 34 of a loudspeaker-like vibrator. Current flowing through a winding 36 fixed to the cone causes the cone and attached cell 32 to vibrate in the field provided by a magnet (not shown). A multivibrator 38 generates a signal of frequency $f$. This is applied to the coil 36 to energize it whereby the cone 34 and attached cell 32 is caused to vibrate at the frequency $f$. Current from a voltage source 35 is conducted through the cell 32 and to an amplifier 40. The current flowing through the cell includes the terms $Af$, $B2f$, $C4f$ . . . where A represents the amplitude of signals of frequency $f$, B represents the amplitude of signals of frequency $2f$, and C represents the amplitude of signals of frequency $4f$, etc. B is nominally zero except when an object is within a range of distances wherein its image is in focus on the vibrating cell 32, as explained above.

The signal from the amplifier 40 is delivered to a synchronous relay 42. The relay 42 is driven by a frequency doubler 44 which is connected to the same multivibrator 38 which drives the vibrator coil 36. The synchronous relay 42 thus samples the signal derived from the amplifier 40 at a frequency of $2f$, and the sampled output has an average value proportionate to $K(B+C+ \ldots)$. The sampled signal of the synchronous relay is applied to an integrator circuit 46 to be integrated, so that only its average value $K(B+C+ \ldots)$ is obtained, where K is a constant for the system. The average value is proportionate to all even harmonics. This signal is then applied to the contacts of a relay operated at frequency $2f$ by the output of the frequency doubler 44. The output from the contacts of relay 48 then comprises an audio signal K'' $2f$ wherein K'' is proportional to $$K(B+C+ \ldots)$$

which can be heard by a blind person using earphones 50. The amplitude of the audio signal is proportional to the strength or amplitude of the even harmonics and frequency multiples of $2f$ generated by by the photocell 32. Thus, the occurrence of an audio signal serves to warn a blind person since it signifies that an object is within the predetermined distance range wherein objects are detectable. The audio signals are larger for a large, bright object than for a small one, and the signals grow stronger as the object approaches the center of the range.

Among the important parameters to be considered in the design of a rangefinder are the characteristics of the photosensitive cell. Let us consider, e.g., that the relationship between the intensity of illumination of a local area of a photocell and the resulting conduction or other characteristics of the cell can be given by the equation:

$$g = kI^p$$

where $g$ = conductance of the local cell area (for a photoconductive cell)
$I$ = the intensity of illumination of that area
$k$ = a constant, and
$p$ = a constant representative of the nonlinearity of the cell.

For the parallel plate photocell geometry, $p$ is equal to 1, then the cell has linear characteristics, the conductance does not vary with degree of focus, and the cell is generally not useful in the present invention. According to one consideration, the ideal value of $p$ is that value which reduces false indications, i.e., which prevents the generation of harmonic signals by an object not within range. In order to reduce false indications, it is desirable that the conductance of a photoconductive cell vary linearly with distance of the cell from the point of focus, like the cell of FIGURE 2. When such a cell is moved or vibrated sinusoidally with time, a pure sinusoidal waveform is generated for out-of-focus objects, and no spurious harmonic signals are generated.

In the case of point objects, the characteristics of FIGURE 2 are obtained by a photocell in which $p$, the constant representative of the non-linearity of the cell, is one-half. The requirement that $p$ be one-half in this case can be appreciated by considering the fact that when a circle of light generated by a point source is moved twice the distance from the position of focus, a circle of one-fourth the intensity and four times the area is established. For a $p$ of one-half, each original area then contributes one-half (the square root of one-fourth, which is the new illumination on the area) its former contribution to conductance, the total area of four original areas contributes a total of twice the conductance, and the net conductance has increased by a factor of two for a displacement of the cell by a factor of two. The relationship between displacement of the cell and electrical output is then linear. For a source of light other than a point source, the ideal value of $p$ for minimum false indications may not be one-half.

The optimum value of $p$ for a rangefinding device depends on the most probable source of errors likely to be encountered. One of the potential uses of such a device is as a mobility aid for the blind. In this application, some of the most likely sources of false indications are bright reflections from out-of-range objects such as windshields or auto bumpers. A distant glare spot is similar to a point source of light. As explained above, $p = \frac{1}{2}$ is normally the ideal value for obtaining a linear relationship between electrical output and displacement of a cell, in the case of a point source, and thus is the ideal value for preventing false signals from glare spots. For other applications of this invention, a different value of $p$ may be required so that false indications are minimized for the most likely source of out-of-range light. It is generally impossible to obtain a photocell with a value of $p$ near the optimum over the entire range of illumination likely to be encountered; however, the desired value of $p$ can generally be obtained over the more limited ranges of illumination expected from error producing objects or backgrounds. In the case of mobility aids for the blind, this intensity of illumination is the general magnitude obtained from reflections of the sun by highly reflective surfaces.

A rangefinder unit has been constructed in accordance with this invention, using a 5/8" diameter cadmium-selenide photoconductive cell. The photocell was mounted on a loudspeaker cone behind a lens having an $f$ number of 1.2 and focal length of 58 mm. The loudspeaker coil was energized by a multivibrator operating at 30 cycles per second and generating a signal sufficient to vibrate the cone with an amplitude of about one millimeter. A detection circuit similar to the circuit of FIGURE 8 was employed to obtain audible signals of 60 cycles per second when an object was detected.

The above-described unit was tested in daylight on sunny days and on days of moderate overcast. The detection of objects was most accurately made when the average lens-to-cell distance was set for objects at a distance of five to fifteen feet. When focused to detect objects at a distance of approximately eight feet, the characteristics of the audible signals were such as to enable the location of an object to within one foot. Objects such as bushes, automobiles and people with light colored clothing, were found to be easily detectable.

In the operation of a rangefinder device constructed in accordance with the invention, the average lens-to-cell distance may be decreased or increased to detect objects at a farther or nearer range. The amplitude of vibration of the cell must be very small for large ranges in order to limit the distance at which objects are detected. For example, to search for objects in the 20 to 30 foot range, the amplitude of vibration may have to be much smaller than is required for the six to eight foot range. However, as vibrations are reduced, the sensitivity of the device is reduced so there are practical limitations on the ranges for which the device can be used. One of the important features of this invention is that the sensitivity of the device is substantially constant over the entire field of view so that objects not in the center of the field are just as easily detected as objects at the center.

Although a photoconductive cell has been particularly mentioned in the foregoing description, other types may be used instead. For example, phototransistors or photovoltaic cells which generate currents may be used in place of the photoconductive cell and battery, and cells having capacitances which vary with incident light may be used in an oscillator circuit wherein changes of frequency are detected.

The images cast on the cell are preferably brought into sharp focus for objects within the detectable range. However, the sharpness of image is not critical, the only necessity being that there be an appreciable change of sharpness of image as the cell vibrates past the position of maximum focus. Hence, complicated lens systems for projecting optimum images are not necessarily required. The lens system need not be refractive, but may comprise a concave mirror or any of a variety of lens means for casting images.

Although particular embodiments of the invention have been described in detail, many further modifications in the mechanical and electrical apparatus may be employed without departing from the spirit and scope of the claims which follow herein. For example, the lens may be vibrated instead of the photocell, and any of a variety of vibrating devices besides a loudspeaker-like device may be employed; or, the detection circuitry may have any one of numerous forms and the output of the device may be used in any of numerous applications. The invention lends itself to use in servo applications where the output signal from the photocell is employed to control motion until the object being scanned is in focus. Furthermore, this invention should not be considered as restricted to visible light application since it can be employed for infrared operation for example, employing infrared lenses and infrared sensitive cells.

What is claimed is:

1. A ranging instrument for producing an indication of the presence of an object within a predetermined zone by the light reflected therefrom comprising:
   a photosensitive cell for generating output electrical signals which vary with changes in the incident light thereon, said photosensitive cell having nonlinear light to electrical signal response characteristics,
   lens means mounted for focusing an optical image of said object on said photosensitive cell,
   vibration means connected to said photosensitive cell for continuously reciprocally moving said photosensitive cell at a given frequency relative to said lens means along the light path therebetween and through the location at which said optical image is focused on said photosensitive cell,
   electrical signal detection means connected to the output of said photosensitive cell for detecting a harmonic change of a component of output signals from said photosensitive cell output which occurs while the direction of movement of said photosensitive cell is constant, and
   means connected to the output of said electrical signal detection means for producing an indication of the presence of said object in said zone and the nearness thereof by said harmonic change.

2. A ranging instrument as defined in claim 1 wherein said detection means includes harmonic frequency detection means for detecting components of said electrical signals having a frequency which is a harmonic of said frequency of vibration of said vibration means.

3. A ranging instrument as defined in claim 1 wherein said vibration means includes a platform fixed to said photosensitive cell,
   vibrating motor means connected to said platform for vibrating said platform,
   a source of alternating electrical current,
   and means connected to said vibrating motor means and to said source for applying an alternating electrical current from said source to said vibrating motor means for driving said vibrating motor means and said platform at the frequency of said alternating electrical current.

4. A ranging instrument as defined in claim 3 wherein said electrical signal detection means comprises synchronous relay means connected to said source of alternating electrical current and to the output of said photosensitive cell for sampling said output at twice the frequency of vibration of said platform and in constant phase relationship therewith,
   intergrator means connected to said synchronous relay means for integrating the output of said synchronous relay means into a signal having an amplitude indicative of the location of said object within said predetermined zone.

5. A ranging instrument for indicating the presence of an object within a predetermined zone by the light reflected therefrom comprising,
   a planar photosensitive cell having nonlinear light to electrical signal conversion characteristics for generating an electrical signal which varies with changes of light thereon,
   a lens,
   means for supporting said lens for focusing an image of said object on said photosensitive cell, means for generating a first signal having a fundamental frequency, means connected to said means for generating a first signal for vibrating said photosensitive cell responsive to said first signal in a path toward and away from said lens along the optical path therebetween and including the location at which said image of said object is focused on said photosensitive cell, frequency doubling means connected to said means for generating a first signal for generating a second signal at twice the frequency of said first signal and in substantially constant phase relationship therewith, synchronous relay means connected to said frequency doubling means to provide switching operation of said relay means at the frequency of said second signal, amplifying means connecting said synchronous relay means to the output of said photosensitive cell for producing an output signal proportional to the amplitude of the signal from said photosensitive cell, and at twice the frequency of vibration of said cell when said image of said object is focussed on said photosensitive cell, integrator means connected to the output of said relay means for generating a current substantially proportional to the average value of the output signal from said relay means, and indicating means connected to the output of said integrator means for converting said integrator means output to an indication of the presence and location of said object within said predetermined zone.

6. A ranging instrument as recited in claim 5 wherein said indicating means comprises a second relay means, means first connection for applying said frequency doubling means output to said second relay means to provide switching operation at the frequency of said second signal, second connection means for applying the output of said integrator to said second relay means to be converted to a signal having the basic frequency of said second signal and an amplitude representative of the location of said object within said zone, and means connected to the output of the second relay means for producing an audio indicating of said signal.

References Cited
UNITED STATES PATENTS

| | | |
|---|---|---|
| 3,039,353 | 6/1962 | Coates et al. |
| 3,041,459 | 6/1962 | Greene _____ 250—201 |
| 3,218,909 | 11/1965 | Fain. |

JEWELL H. PEDERSEN, *Primary Examiner.*

F. L. EVANS, *Assistant Examiner.*